United States Patent [19]
Kowalczyk et al.

[11] Patent Number: 5,439,286
[45] Date of Patent: * Aug. 8, 1995

[54] METHODS OF CONSTRUCTING DRIVE ELEMENTS INCLUDING PADDLE AND SHAFT ASSEMBLIES FOR TWIN SCREW MIXER AND/OR PROCESSORS AND THE RESULTING APPARATUS

[75] Inventors: James E. Kowalczyk; Bernard A. Loomans, both of Saginaw, Mich.

[73] Assignee: APV Chemical Machinery Inc., Saginaw, Mich.

[*] Notice: The portion of the term of this patent subsequent to Apr. 19, 2011 has been disclaimed.

[21] Appl. No.: 189,180

[22] Filed: Jan. 31, 1994

Related U.S. Application Data

[63] Continuation of Ser. No. 98,134, Jul. 28, 1993, Pat. No. 5,304,000.

[51] Int. Cl.6 .................................. B29B 1/06
[52] U.S. Cl. ........................... 366/97; 29/525; 366/85; 366/301
[58] Field of Search .............. 366/85, 86, 96, 97, 366/98, 99, 301, 297, 298, 299, 300, 325, 331; 29/525

[56] References Cited

U.S. PATENT DOCUMENTS

| | | |
|---|---|---|
| 2,668,756 | 2/1954 | Carney . |
| 2,777,353 | 1/1957 | Willis . |
| 3,584,667 | 6/1971 | Reiland . |
| 4,073,013 | 2/1978 | Blach . |
| 4,236,833 | 12/1980 | Blach . |
| 4,269,246 | 5/1981 | Larson et al. . |
| 4,591,487 | 5/1986 | Fritsch . |
| 4,847,968 | 7/1989 | Benddraitas ............ 29/525 |
| 5,048,971 | 9/1991 | Wall ....................... 366/85 |
| 5,171,117 | 12/1992 | Seidl . |

Primary Examiner—Robert W. Jenkins
Attorney, Agent, or Firm—Learman & McCulloch

[57] ABSTRACT

A method of constructing or reconstituting a shaft and paddle assembly for mixers and processors wherein radially aligned paddles on parallel shafts revolving at the same speed in the same direction of rotation both co-wipe and completely wipe the interior of the barrel of the mixer or processor which has a mixer chamber comprising interconnecting cylindrical bores. The co-wiping paddles are formed with paddle bores of a configuration comprising alternating lobular projections and root recesses, and arcuate corner portions on the lobular projections and root recesses. The arcuate corner portions of the projections are tangential to the arcuate corner portions of the root recesses. The shafts are formed with intermeshing matching projections and root recesses.

16 Claims, 7 Drawing Sheets

METHODS OF CONSTRUCTING DRIVE ELEMENTS INCLUDING PADDLE AND SHAFT ASSEMBLIES FOR TWIN SCREW MIXER AND/OR PROCESSORS AND THE RESULTING APPARATUS

This application is a continuation of application Ser. No. 08/098,134, filed Jul. 28, 1993, now U.S. Pat. No. 5,304,000.

The present invention relates to twin screw mixers, extruders or processors and, more particularly, to new and useful improvements in methods of making the paddle shaft assemblies which are employed to enable increases in the mixing power obtained without consequent reduction of the free volume in the twin screw mixer or compounder which would limit the volume of throughput material proceeding through such continuously operating machines.

BACKGROUND OF THE INVENTION

The present invention has been developed for use in twin screw mixing-compounding machines of the type used in the plastics industry, for example, and illustrated in the present assignee's prior U.S. Pat. Nos. 3,195,868 and 4,826,323. The larger machines of this type utilize preferably hydraulic motor-driven shafts with radially mating co-wiping, individual paddles, or worm sections thereon, both of which, hereinafter, are to be included within the term "paddle", as used hereinafter. In machines of this character, the shafts which mount the paddles must be rotated at the same speed, and in the same direction of rotation, in order for the paddles to completely co-wipe one another, and, at the same time, completely wipe the interior of the barrel bore in which they are operative. Whether the paddle employed is of the single or multi-lobe type, the geometry of the surface of one of the paddle components must be generated by the mating paddle component for co-wiping to occur, and these geometric forms are a direct function of barrel bore diameter to shaft center-to-center distance. Normally, to increase the power supplied to the paddles of such machines for mixing purposes and increased output, it is necessary to increase the dimensions of both the paddles and the shafts which drive them, to carry the increased loads at acceptable stress levels. However, to increase shaft diameter for a machine having a given size barrel, it is necessary to alter the bore to center-to-center distance ratio of the twin screw-paddle assembly, which adds to its width. The paddle component wall thickness, accordingly, increases in relationship to the increased shaft diameter and, with thicker paddle elements, the open volume of the machine for the same bore diameter is significantly decreased. Thus, present day machines which are to produce an increased rate of processing product cannot tolerate the power increases which are necessary for processing the materials.

Typically, today, involute gear teeth splines are used to transfer the power from the shafts to the paddles, as disclosed in prior U.S. Pat. No. 4,591,487, but various keys, and hexagonal shaft configurations, have also been proposed. While all are not considered germane to the field of the present invention, applicants are aware of the following prior patents, which they incorporate herein by reference:

U.S. Pat. No. 2,668,756 Carney
U.S. Pat. No. 2,777,353 Willis
U.S. Pat. No. 3,584,667 Reiland
U.S. Pat. No. 4,073,013 Blach
U.S. Pat. No. 4,236,833 Blach
U.S. Pat. No. 4,269,246 Larson et al
U.S. Pat. No. 4,591,487 Fritsch
U.S. Pat. No. 5,171,117 Seidl

SUMMARY OF THE INVENTION

The present invention is concerned with the supply of greater power at lower stress levels to the mixer paddles in given size mixer barrels which presently employ the involute spline shafts which are, at this time, the state of the art in this field. While maintaining adequate hoop strength in the paddles, the method and apparatus of the present invention employs a series of lobes, alternating with root recesses to which they tangentially join, as a configuration for the internal bores of the mixer paddles. These match the lobes and root recesses provided on the exterior periphery of the mixer shafts. For a given size mixer or devolatilizer, with a given size barrel, increased power can be generated. Since much processing in such processors is horsepower hour per pound dependent, more material can be moved through the processor with the increased horsepower to process it.

One of the prime objects of the present invention is to increase the power which is supplied, without decreasing the free volume of the mixer and inhibiting the throughput of material.

A further object of the invention is to promote the use of more reliable equipment which does not risk the imposition of higher load stresses, and potential unreliable equipment operation with consequent premature failure rates.

It is a further object of the invention to provide a twin screw mixer in which the shaft and paddle assemblies are able to generate more power at lower stress levels than in present machines and greatly increase production rates.

A further object of the invention is to provide a twin screw mixer having a paddle and shaft assembly wherein the lobular configuration to be described effects decreases in the shear stresses imposed at certain critical paddle locations, even though stresses increase at other locations to provide, however, a decreased stress ratio, taking into account assembly fit and practical manufacturing tolerances.

Still another object of the invention is to provide higher strength shaft and paddle assemblies, with lower overall stresses involved in the power transfer, through use of an optimum number of novel lobes and lobular root recesses for the configuration.

Still a further object of the invention is to provide an assembly which permits the transmission of higher torques than heretofore possible, with mixers of the same size.

Still another object of the invention is to design a system of the character disclosed wherein the paddles have adequate hoop strength to accept and transmit the increased torque received, without spreading to interfere with the operation of the paddles in their wiping relationship with the barrel walls.

Other objects and advantages of the invention will become apparent with reference to the accompanying drawings and the accompanying descriptive matter.

DETAILED DESCRIPTION OF THE INVENTION

Figure 1:
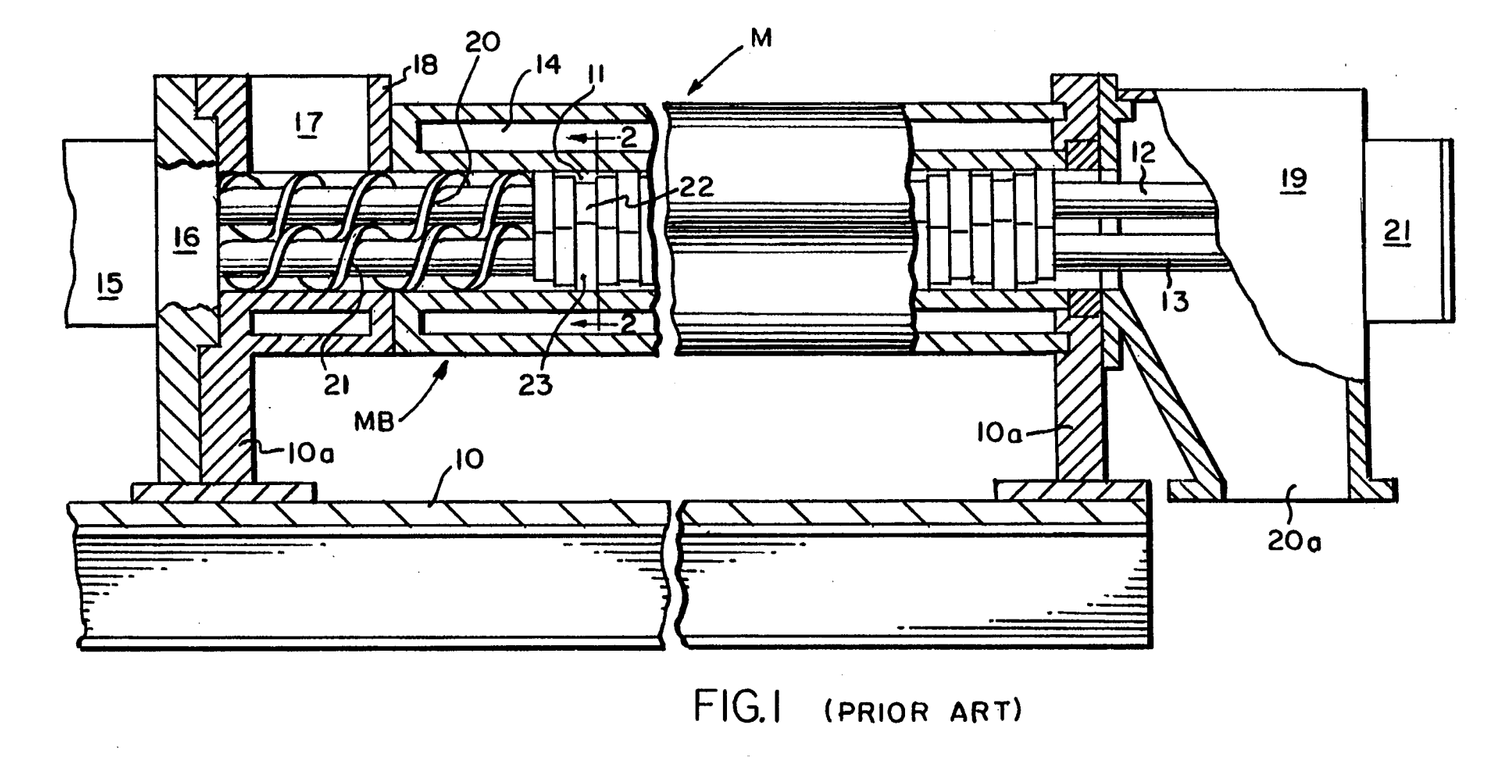
FIG. 1 is a schematic, side elevational, partly sectional view through a twin screw mixer of the type disclosed in some of the present assignee's previous patents.
Figure 2:
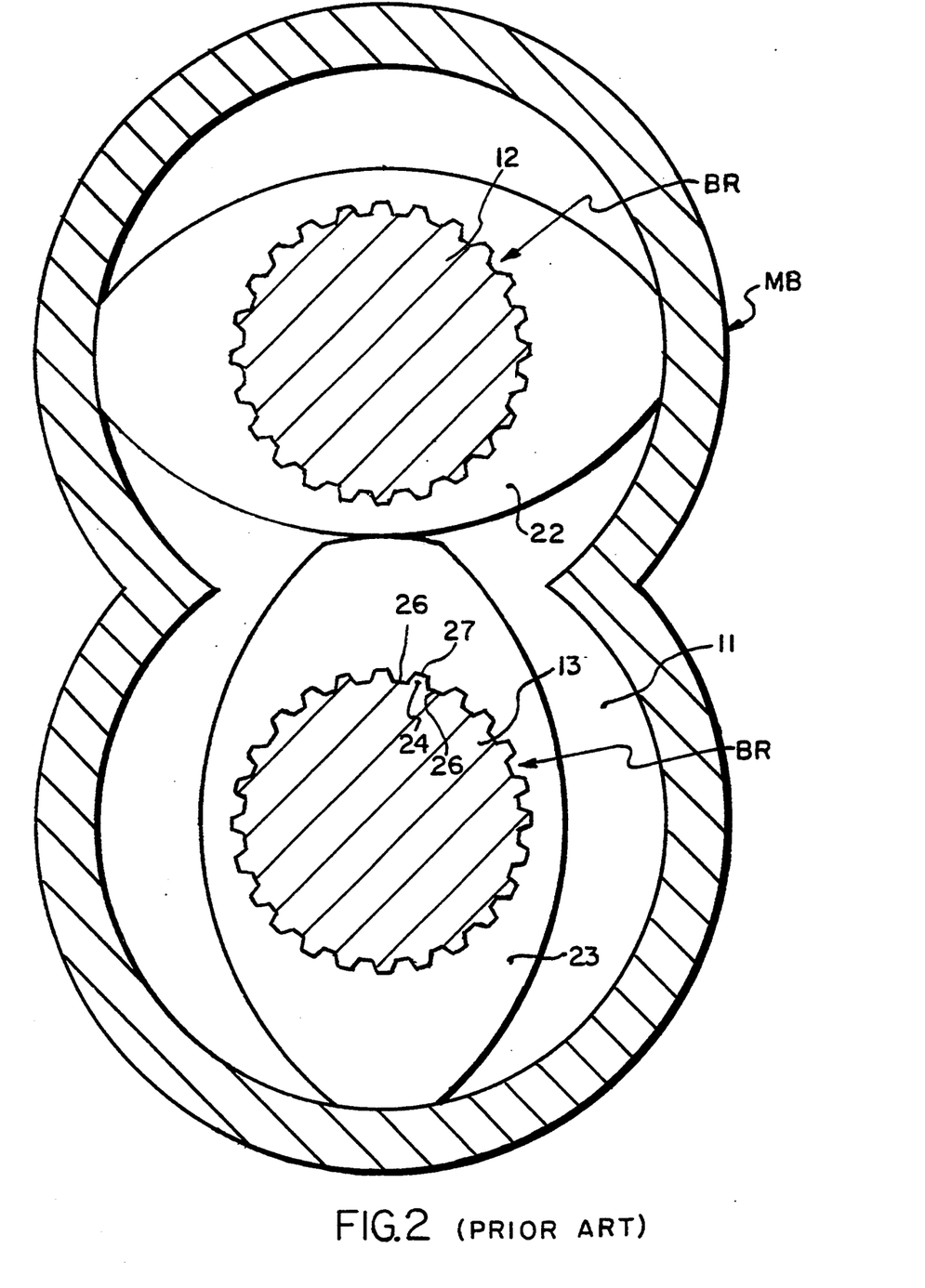
FIG. 2 is an enlarged, schematic, fragmentary, cross-sectional view, taken on the line 2—2 of FIG. 1, disclosing an involute gear configuration for the paddle bores and shaft perimeters.

Referring now to FIGS. 1 and 2 particularly for a description of prior art machinery, a mixer-processor, generally designated M, is shown as comprising a base 10 on which uprights 10a support a mixing barrel generally designated MB. The mixing barrel MB, as FIG. 2 particularly indicates, is of Figure-8-configuration and provides a Figure-8-shaped mixing chamber 11 within which twin mixing shafts 12 and 13 are revolved.

Fixed on the shafts 12 and 13, are paddles in the form of co-wiping screws or worms 20 and 21. Also provided as paddles, and fixed to the shafts 12 and 13, are co-wiping elements 22 and 23 which may be of the lenticular configuration disclosed in FIG. 2. It is to be understood that the pairs of radially co-wiping members 22 and 23 are displaced angularly from one another to provide a successive helical formation, and that a cross section through the elements 20 and 21 would provide the lenticular configuration disclosed in FIG. 2.

Figure 3:
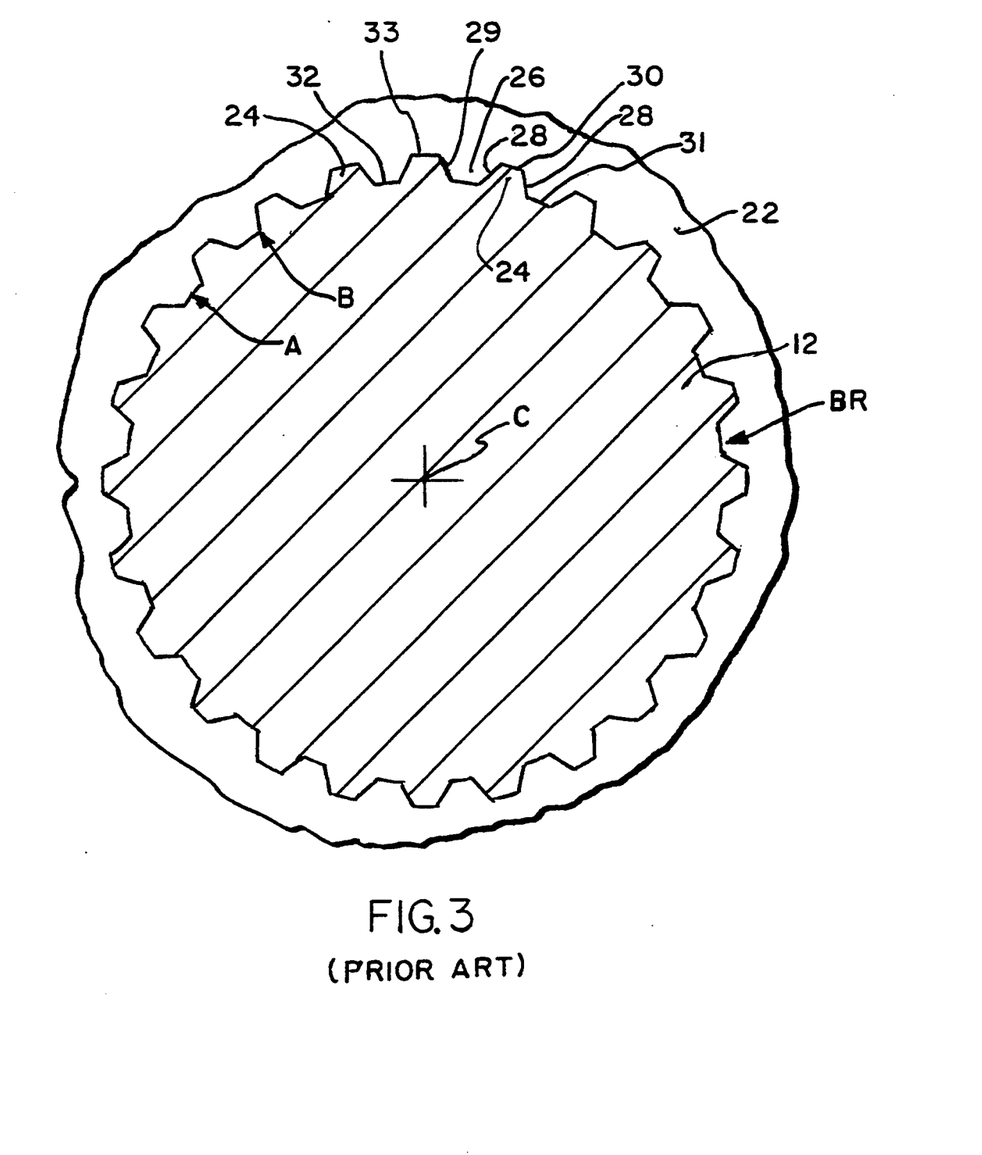
FIG. 3 is an enlarged, fragmentary, schematic, cross-sectional view of the present prior art paddle bore involute spline structure.

As FIG. 2 particularly indicates, the shafts 12 and 13 have an involute gear external configuration which mates with an involute gear configuration provided in the bores of paddles 22 and 23. These involute configurations comprise teeth 24 and roots 25 provided on the shafts 12 and 13 and intermeshed teeth 26 and roots 27 provided in the bore configurations, generally designated BR, of the paddle sections 20 and 21, and 22 and 23. As shown particularly in FIG. 3, the involute teeth 24 and 26 provided on the shaft and paddle bore configurations, respectively, include convex side walls 28 on the teeth 24 and concave side walls 29 on the teeth 26. The convex walls 28 connect the outer peripheral surfaces 30 of the teeth 24 with the inner peripheral surfaces 31 or roots of the involute configurations, surfaces 30 and 31 being taken on radii extending from the shaft center c. Similarly, the concave surfaces 29 connect the peripheral surfaces 32 of teeth 26 with the root surfaces 33 provided in each paddle bore configuration. The surfaces 32 and 33 match the surfaces 31 and 30 respectively, as indicated in FIG. 3, with the exception there is a minor sliding clearance involved between them for manufacturing and assembly purposes.

Figure 4:
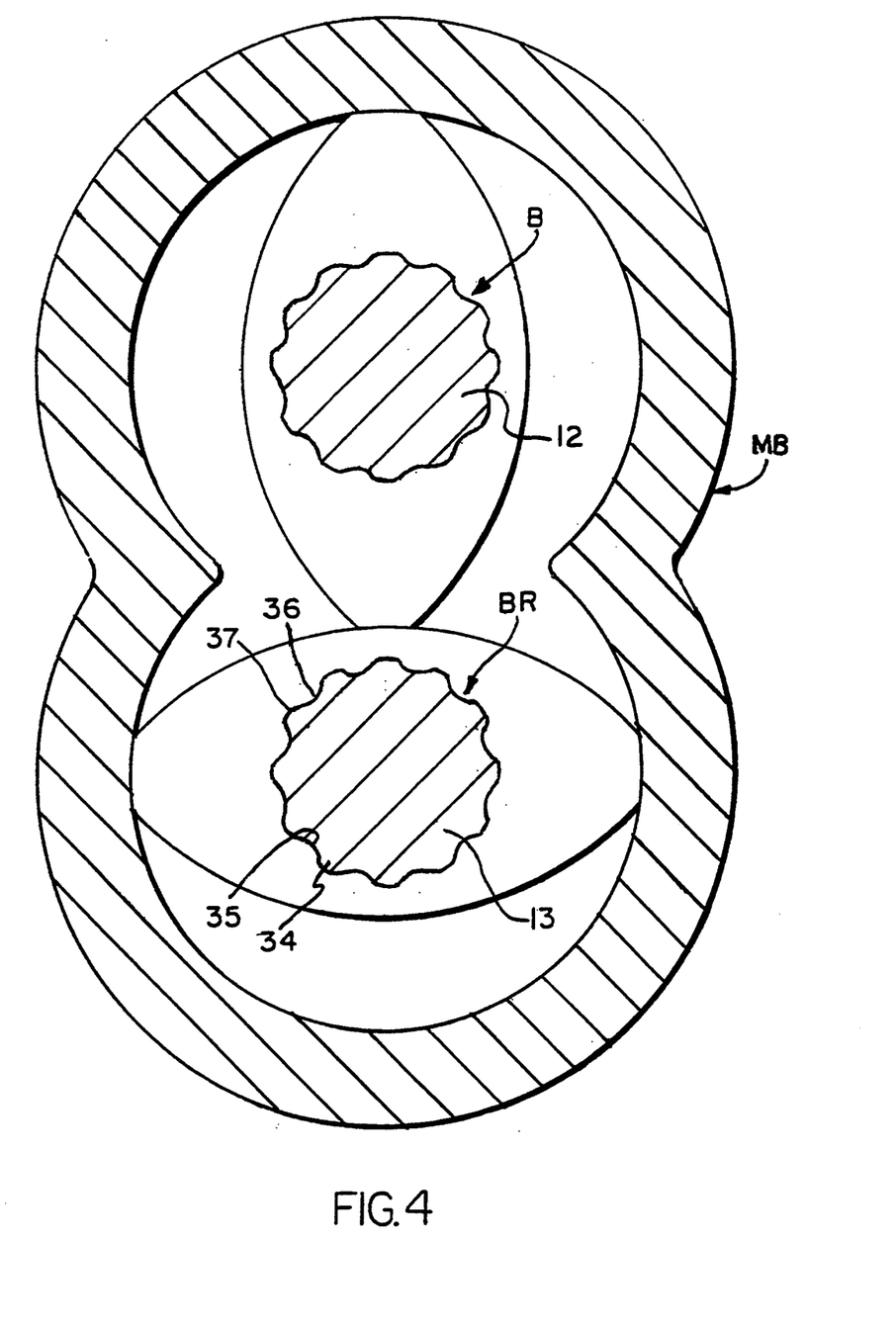
FIG. 4 is an enlarged cross-sectional view, similar to FIG. 2 but disclosing a different, true sine wave, lobular configuration.

In FIG. 4, a different configuration is disclosed in which the same numerals are employed to identify the same parts of the machine. In FIG. 4, the shafts 12 and 13 are provided with lobes 34 separated by recesses 35 which interfit with alternating lobes 36 and recesses 37 provided in the paddle bore BR configurations. The configuration of these lobes and recesses is a sine wave configuration, with the lobes 34 and recesses 35 formed of Curves of the same radius which are fully relatively tangential, and tangentially merge one with the other. The configuration of the bore surfaces 36 and 37 is the same, and matches, except for the manufacturing and assembly clearance mentioned. Torque transmission with the configurations disclosed in FIG. 4 can be accomplished with greater power than the prior art involute configurations presently in use, and with less stress at critical areas via the twelve lobe configuration disclosed.

Figure 5:
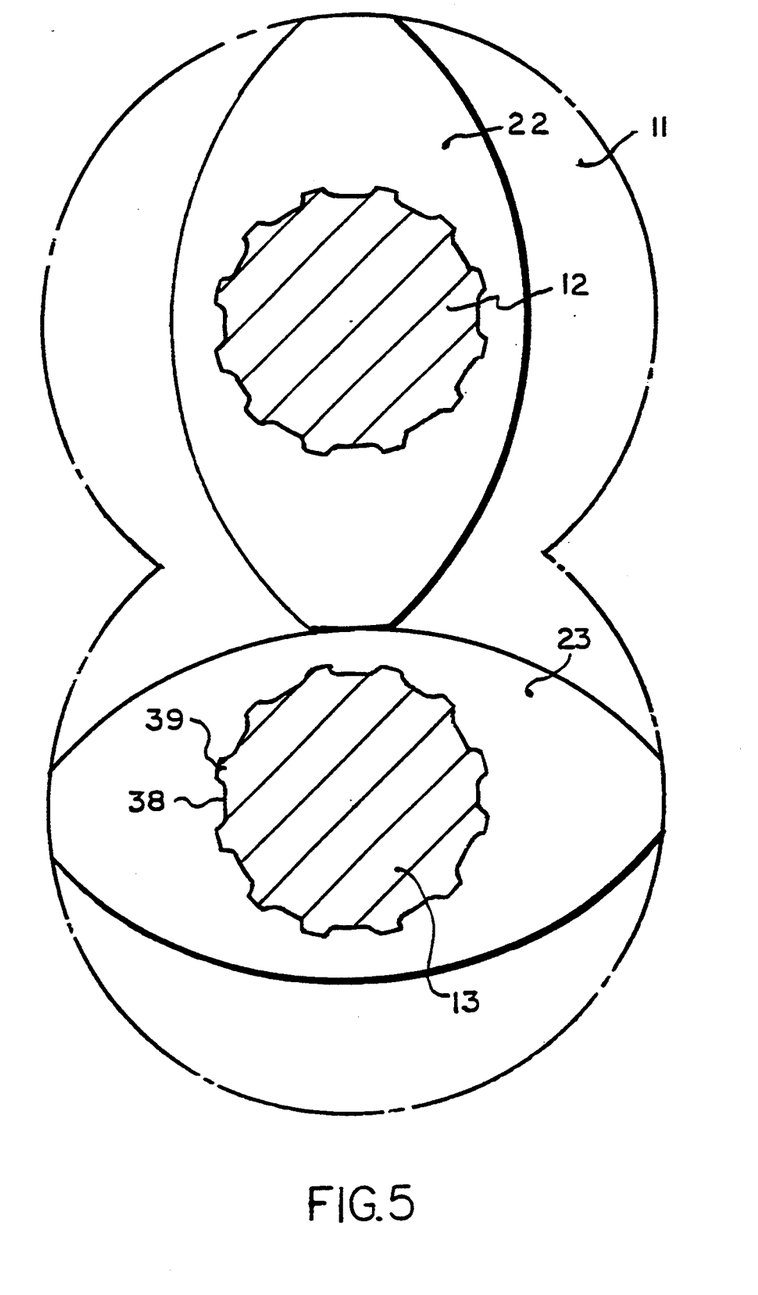
FIG. 5 is a schematic view, similar to FIG. 2, of the preferred embodiment of the shaft and paddle assembly of the present invention, utilized in a mixer barrel of much the same size as in FIG. 2, and demonstrating the increased throughput volume which is available.
Figure 6:
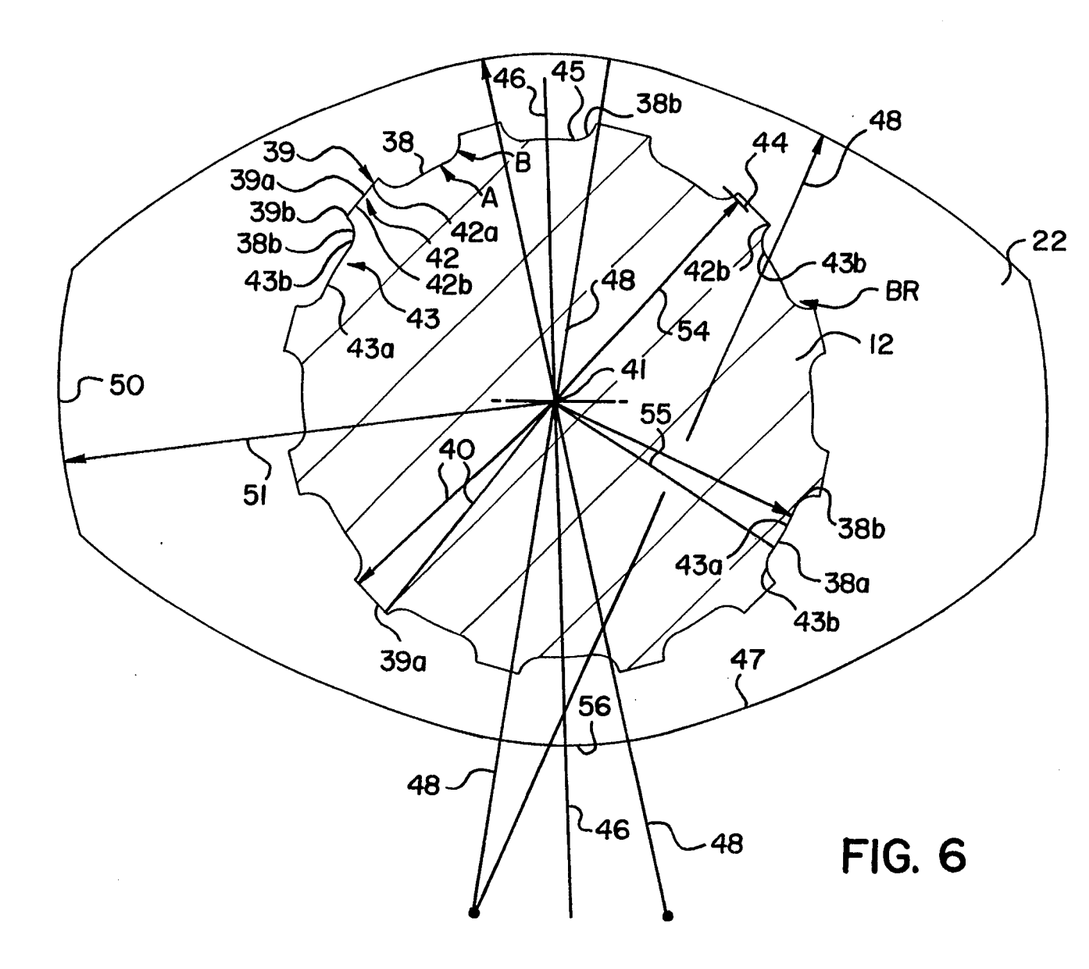
FIG. 6 is an enlarged, cross-sectional, elevational view of one of the preferred paddles and shafts only, wherein the lobe and root corner radii ratio is five to one.

In FIGS. 5 and 6, the preferred embodiment of the invention is illustrated and again the same numerals have been used to identify components which they have previously identified. In FIGS. 5 and 6, the bore BR of each of the paddles 22 and 23 is shown as having twelve alternating lobes and root recesses, generally designated 38 and 39, respectively. The intermediate portions 39a of the root surfaces 39 are taken on a radius 40 from the bore center 41. The shaft 12 includes matching lobes 42 and root recesses 43. As FIG. 6 demonstrates, each root recess portion 43 includes an intermediate surface 43a taken on a radius 55 from shaft center 41 and it is to be noted that the radii 55 at the ends of each surface 43a subtend an angle of 7.5°. The paddle lobes 38 include matching intermediate surfaces 38a, subtending the same angle, as FIG. 6 indicates.

There are, of course, the usual operating sliding clearances between the intermeshing surfaces on the paddles and shafts which permit manufacture and assembly of these component parts. Provided to connect the shaft surfaces 42a, which are generated on radii 40 and the root recess surfaces 43a which are generated on radii 55 are tangentially merging arcuate corner radiuses 42b on the lobes 42 and arcuate corner radiuses 43b which tangentially merge with the surfaces 43a. Matching-merging surfaces 38b and 39b are provided in the paddle bore configurations BR.

In the representative paddles disclosed in FIG. 6, where dimensions are utilized to illustrate the specific formation of the paddle and shaft, it will be noted that the corner surfaces 42b are taken on a radius of 0.0148 inches about a point 44 located on a radius 54. The surfaces 38b are taken on radii of 0.0741 inches from points 45 which are located to provide tangency between the surfaces 39b and 38a. The relationship between the radii which provide corner surfaces 42b and surfaces 38b is linear and in the preferred embodiment is five-to-one. Of course, matching the arcuate paddle bore surfaces 38b and the arcuate paddle corner surfaces 42b are shaft surfaces 43b and paddle surfaces 39b respectively.

It is to be noted that the paddle exterior surfaces include mid-surfaces 56 generated about radii 46 and arcuate portions 47 extending endwisely from surfaces 56 which are generated about radii 48 (taken from points 49) subtended by angles of 11.25° from the radius 46. The end surfaces 50 are taken on radii 51 from the center 41.

Figure 7:
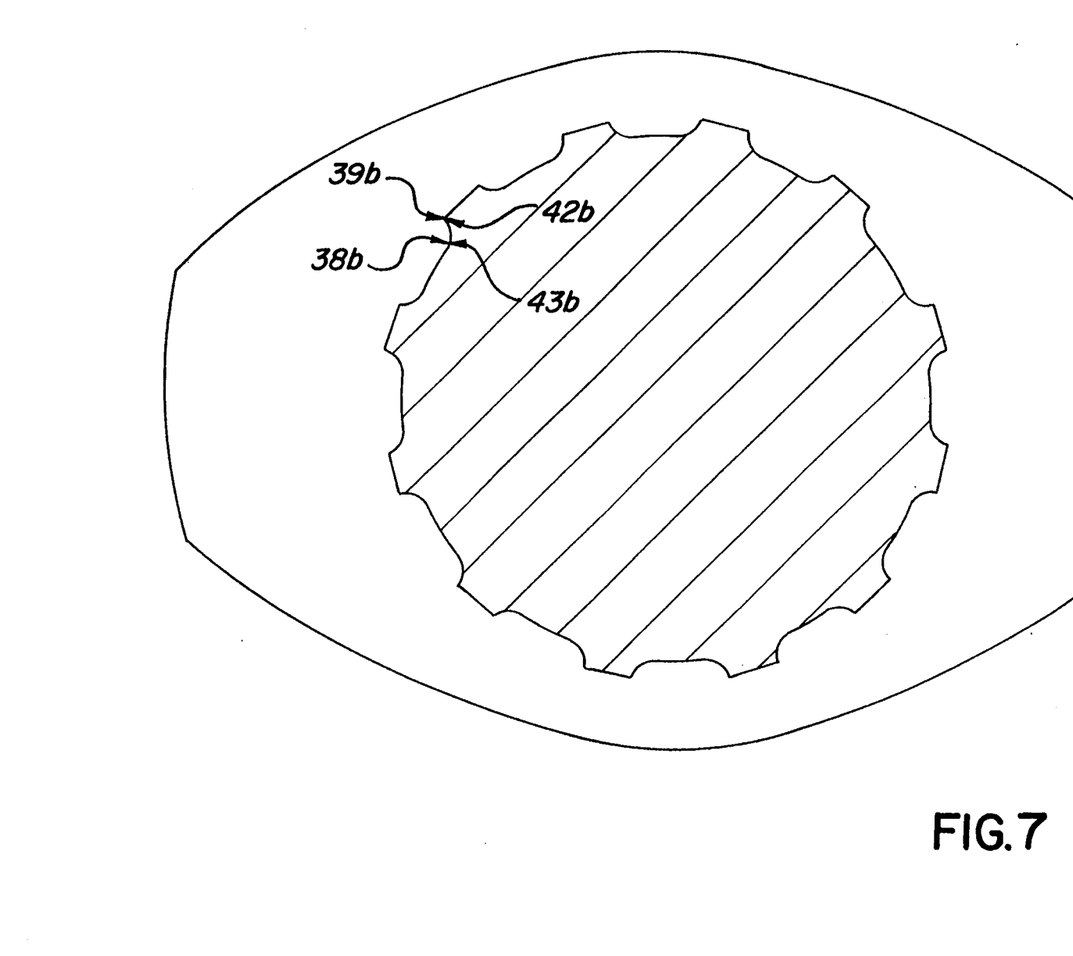
FIG. 7 is an enlarged fragmentary, cross-sectional, elevational view of another embodiment, with tangentially mating corner radii utilized on a three-to-one scale.

In FIG. 7, we have disclosed a paddle and shaft assembly which is very similar to the paddle and shaft assembly disclosed in FIG. 6, except that the ratio between the paddle bore surfaces 38b and 39b is three-to-one, rather than five-to-one as in FIG. 6. In FIG. 6, the transmission stress in the components was further reduced by changing the root radius at 43b as a function of the tip radius of the lobe at 42b in a linear fashion. Better results were achieved in the FIG. 6 version than in the FIG. 7 version. The FIG. 7 version is however superior to the sinusoidal configuration disclosed in FIG. 4, which is still superior to the prior art involute configuration disclosed in FIGS. 1–3.

Comparing now FIGS. 2 and 5, which are close to scale, although not exactly, it will be evident that a considerably greater free volume within chamber 11 is provided in FIG. 5 i.e. about twenty-three percent more net volume. The shafts and paddles in FIGS. 2 and 5 are transferring the same power but, because of improved stress characteristics, the FIG. 5 shafts 12 and 13 can be somewhat smaller. This permits the center-to-center distance of the shafts 12 and 13 to be reduced in FIG. 5 and accordingly the paddles 22 and 23 to be considerably thinner.

It is to be emphasized that the configurations developed by applicant are developed as the result of the balancing of the various stresses to which the assemblies are subjected in performing their function. In the case of applicants' FIG. 6, the stresses were, by test, considered to provide a stress balance which enabled the greater power to be transferred. One of the tests which is important to applicants' assignee in marketing its twin screw equipment is the torsional stress analysis and what is termed the shear concentration, which is defined as the shear stress at a point B divided by the shear stress at a point A. For the involute configuration of FIG. 3 and the preferred configuration shown in FIG. 6, point A is located at the root diameter recess while point B is located at the root of the tooth.

In terms of pounds per square inch, the stress concentration for the involute convolution shown in FIGS. 2 and 3 was 1.81 in tests which were conducted. For a twelve splined involute configuration it was higher at 2.11. In contrast, the comparable stress concentration for the FIG. 4 configuration was 1.37. For the configuration using a tooth root radius to tip radius of three-to-one (FIG. 7), the stress concentration was 1.27, and, when that tooth root radius-to tip radius ratio was five-to-one, the stress concentration had decreased to 1.23. Applicants, in the preferred embodiment of the invention disclosed in FIG. 6, have greatly increased the size of the radius at the root of the lobe at point B to avoid a failure situation in which the shear stress at point B was such that yield strength in shear was exceeded. The hoop strength of the paddle elements 22 and 23 is also a consideration, and must be held within permissible values. In applicants' embodiments, sufficient material remains between the lobular projections of the shaft and the paddle wall portions 56 for the paddle to have sufficient hoop strength.

THE OPERATION

In operation it is to be assumed that the machine shown in FIG. 1 is the machine utilizing applicants' invention. Material to be blended continuously is fed through opening 17, advanced by paddles 20 and 21, more intimately blended by paddles 22 and 23 and continuously discharged at 20. In prior art machinery a maximum of about 75 horsepower can be utilized to obtain a production rate of about 2000 pounds per hour. With applicants new method, with the mixing chamber shafts, and paddles remaining the same size, and the speed of operation remaining the same the horsepower can be safely about doubled with the result that twice as much material can be charged through opening 17 and blended with the increased power. Whereas, previously about fifty percent of the available volume was filled with material, now about 75% can be. The relationship between mixing horsepower and output is linear.

In summary, from a paddle torsional stress consideration, the inventor's configurations disclosed here are clearly superior. Sufficient hoop strength was retained, as was what is termed contact stress strength, when clearances were in the nature of 0.005 inches. Applicant has essentially been able to achieve the greater throughput volume with configurations which are superior in terms of torsional stress analysis, while holding the other stresses imposed within acceptable limits.

It is to be understood that the embodiments described are exemplary of various forms of the invention only and that the invention is defined in the appended claims which contemplate various modifications within the spirit and scope of the invention.

What is claimed is:

1. A method of constructing or reconstituting drive assemblies comprising a shaft and an element in driving interrelationship therwith, comprising the steps of:
   (a) forming the element with a bore of a configuration comprising alternating lobular projections and root recesses, and arcuate corner portions on the lobular projections and root recesses, the arcuate corner portions of said projections being tangential to the arcuate corner portions of said root recesses;
   (b) forming the shaft with intermeshing matching projections and root recesses and mounting said element on said shaft with the lobes and root recesses of the element and shaft in intermeshing relation.

2. The method of claim 1 wherein said element lobular projections and root recesses are formed with intermediate surface portions between the arcuate corner portions of each, generated on radii taken from the center of said bore and merging tangentially with said arcuate corner portions.

3. The method of claim 2 wherein said bore is formed with intermediate surface portions on the lobular projections which are of greater length than the intermediate surface portions provided on the recesses of the bore, and there are twelve such lobular projections.

4. The method of claim 1 wherein stress concentrations are reduced by generating the arcuate corner surfaces of the lobular projections on greater radii which are a multiple of the radii on which the arcuate corner portions of the root recesses are generated.

5. The method of claim 4 in which the multiple is 3:1.

6. The method of claim 4 in which the multiple is 5:1.

7. A method of increasing the drive of a drive assembly comprising a shaft and an element in driving interrelationship therewith, comprising the steps of:
   (a) forming the element with a bore of a configuration comprising equally circumferentially spaced projections with root surfaces between them, the projections and root surfaces having arcuate corner portions together joining the projections and root surfaces, and together consisting of a pair of oppositely curved, tangentially merging arcuate surfaces which also tangentially merge with said projections and root surfaces;

(b) forming said shaft with matching intermeshing projections and root surfaces except for assembly clearances; and (c) applying an increased horsepower drive to one of said shaft and element.

8. The method of claim 7 wherein said lobular projections and root recesses are formed with intermediate surface portions between the arcuate corner portions of each generated on radii taken from the center of said bore and merging tangentially with said arcuate corner portions, wherein said bore is formed with intermediate surface portions on the lobular projections which are greater in length than the intermediate surface portions provided on the root recesses of the bore, and there are twelve such lobular projections and twelve such root recesses.

9. The method of claim 7 wherein stress concentrations are reduced by generating the arcuate corner surfaces of the lobular projections on greater radii which are a multiple of the radii on which the arcuate corner portions of the root recesses are generated.

10. The method of claim 9 in which the multiple is 3:1.

11. The method of claim 9 in which the multiple is 5:1.

12. In a drive assembly comprising a shaft and an element in driving interrelationship therewith:

(a) a shaft;

(b) art element with an opening having an axis corresponding to said shaft axis which is configured to receive said shaft in driving relationship;

(c) said opening configuration comprising alternating lobular projections and root recesses with alternate peripheral surface portions taken-on a major and minor radius respectively from the axis of the opening, and arcuate corner edge portions, the arcuate corner edge portions of said projections being tangential to the arcuate corner edge portions of said root recesses, and said projection arcuate corner surfaces being generally taken on greater radii which are a multiple of the radii on which said arcuate corner portions of the root recesses are taken; and (d) said shaft having intermeshing matching projections and root recesses received by the root recesses and projections of said opening respectively.

13. The assembly of claim 12 wherein there are twelve such projections.

14. The assembly of claim 12 wherein the multiple is 3:1.

15. The assembly of claim 12 wherein the multiple is 5:1.

16. The assembly of claim 12 wherein the lobular projections and root recesses have intermediate peripheral surface portions generated on radii taken from the axes of said opening and said peripheral surface of the intermediate surface portions of the lobular projections are substantially greater than the peripheral lengths of said root recess intermediate surface portions.

* * * * *

UNITED STATES PATENT AND TRADEMARK OFFICE
CERTIFICATE OF CORRECTION

PATENT NO. : 5,439,286
DATED : August 8, 1995
INVENTOR(S) : James E. Kowalczyk et al.

It is certified that error appears in the above-identified patent and that said Letters Patent is hereby corrected as shown below:

Column 8, line 2, change "art" to -- an --.

Signed and Sealed this

Tenth Day of October, 1995

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,439,286
DATED : Aug. 8, 1995
INVENTOR(S) : Kowalczyk et al.

It is certified that error appears in the above-identified patent and that said Letters Patent is hereby corrected as shown below:

On the title page, item [56], under References Cited, insert the following:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 2 | 0 | 1 | 5 | 4 | 3 | 0 | 2/37 | Mathews | | | |
| | | 3 | 6 | 1 | 8 | 9 | 0 | 2 | 11/71 | Brennan | | | |
| | | 4 | 3 | 5 | 7 | 1 | 3 | 7 | 11/82 | Brown | | | |
| | | | | | | | | | | | | | |

FOREIGN PATENT OR PUBLISHED FOREIGN PATENT APPLICATION

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | | 1 | 2 | 6 | 4 | 8 | 8 | 3 | 3/68 | Germany | | | | |
| | | 3 | 6 | 3 | 5 | 9 | 1 | 6 | 3/88 | Germany | | | | |
| | | | | | | | | | | | | | | |
| | | | | | | | | | | | | | | |

Signed and Sealed this

Sixteenth Day of February, 1999

Attest:

Attesting Officer

*Acting Commissioner of Patents and Trademarks*